United States Patent [19]
Geis, Jr.

[11] 3,930,421
[45] Jan. 6, 1976

[54] DIFFERENTIAL HOUSING COVER
[76] Inventor: John J. Geis, Jr., 5630 Limerick St., San Diego, Calif. 92117
[22] Filed: Jan. 16, 1975
[21] Appl. No.: 541,643

[52] U.S. Cl.................................. 74/607; 180/88
[51] Int. Cl.² ......................................... F16H 57/02
[58] Field of Search ........... 74/607, 710; 180/75, 88

[56] References Cited
UNITED STATES PATENTS
1,973,905  9/1934  Leach ................................... 74/607
3,270,583  9/1966  Rudnicki et al. ...................... 74/607

Primary Examiner—Samuel Scott
Assistant Examiner—F. D. Shoemaker
Attorney, Agent, or Firm—Richard K. Macneill

[57] ABSTRACT

A differential housing cover for attachment to a standard differential housing having a pair of compression bolts threadably coupled thereto extending within the differential housing; the compression bolts each having a swivel cap in contact with the carrier cap of the differential system for prevention of rear-end failures because of carrier cap breakage.

4 Claims, 4 Drawing Figures

DIFFERENTIAL HOUSING COVER

BRIEF DESCRIPTION OF THE INVENTION

The present invention is related to a differential gear housing cover and more particularly to a differential gear housing for eliminating carrier cap breakage.

According to the invention, the differential housing rear cover is provided having first and second compression bolts threadably engaged therewith and extending into the differential housing. The bolts are preferably terminated in swivel caps for abutment with the carrier cap in the differential transmission system. This prevents excessive loading on the carrier cap during rapid acceleration and, hence, cap breakabe. The rear cover has reinforcement ribs extending from the two compression bolts which leads additional strength and rigidity to the entire system.

An object of the present invention is the provision of an improved differential housing rear cover.

Another object is the provision of a differential housing cover which prevents carrier cap breakage.

A further object of the invention is the provision of a differential housing rear cover which increases the entire housing rigidity.

Yet another object of the present invention is the provision of a differential housing rear cover resulting in long gear life.

A still further object of the present invention is the provision of a differential housing rear cover which is inexpensive to manufacture and extremely simple to install.

Other objects and many of the attendant advantages of the present invention will be readily appreciated as the same becomes better understood by reference to the following detailed description when considered in connection with the accompanying drawing in which like reference numerals designate like parts throughout the Figures thereof and wherein.

DETAILED DESCRIPTION OF THE INVENTION

Figure 1:
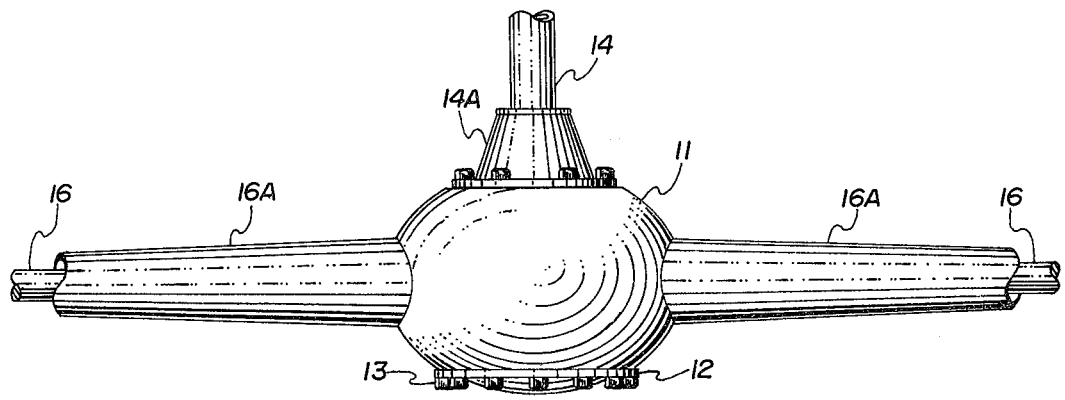
FIG. 1 is a top plan view of a typical prior art differential housing.

Referring to FIG. 1, a typical prior art differential housing is shown at 11 with a typical prior art rear cover 12 attached as by bolts 13. Drive shaft 14 enters one of differential housing 11 through drive shaft housing 14A and axle 16 extends from the sides of differential housing 11 through axle housings 16A.

Figures 2, 3:
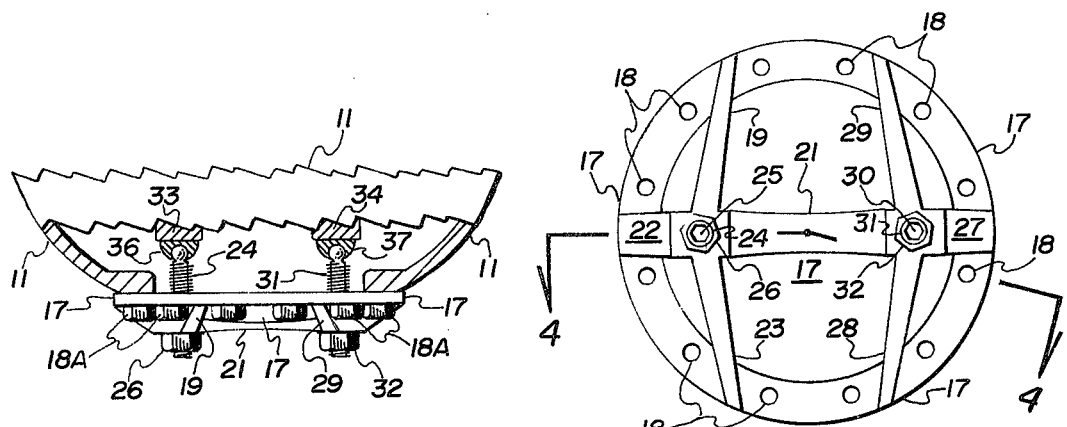
FIG. 2 is a side elevational view of the differential housing rear cover of the present invention.
FIG. 3 is a top plan view partially sectioned of the cover in situ.

Referring to FIG. 2, the rear cover 17 of the present invention is shown with mounting holes 18 around the periphery thereof. Ribbed sections 19, 21, 22 and 23 all converge on compression bolt 24 which is in threadable engagement with lock nut 26. Reinforcement ribs 21, 27, 28 and 29 all converge toward compression bolt 31 which is in threadable engagement with lock nut 32. Compression bolts 31 and 32 have allen wrench recess 25 and 30, respectively.

Referring to FIG. 3, differential housing 11 is shown carrying cover 17 with compression bolts 24 and 31 threadably engaged therewith and in threadable engagement with lock nut 26 and 32, respectively. Carrier caps 33 and 34 are in abutment with swivel cap 36 and 37, respectively, which terminate compression bolts 24 and 31, respectively.

Figure 4:
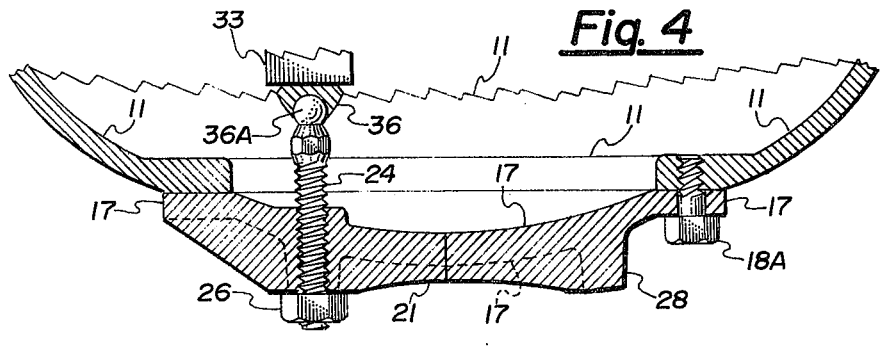
FIG. 4 is a cross sectional view taken along lines 4 — 4 of FIG. 2.

Referring to FIG. 4, differential housing 11 is shown with mounting bolt 18A in threadable engagement therewith, coupling rear cover 17 thereto. Compression bolt 24 is in threadable engagement with cover 17 and with lock nut 26. Compression bolt 24 terminates in ball 36A which carries swivel cap 36 in abutment with carrier cap 33.

OPERATION

Referring to FIGS. 1, 2, 3 and 4, it can be seen that the differential housing rear cover 17 has mounting apertures 18 spaced for replacement of rear cover 12 of FIG. 1 without modification to differential housing 11. After rear cover 17 has been bolted in place with mounting bolts 17A to a differential housing the compression bolts are adjusted via the Allen Head depression 25 to a predetermined torque after which lock nuts 26 and 32 are tightened.

With the rear cover 17 in place and the lock nuts and the compression bolts properly adjusted, carrier caps 33 and 34 are pre-loaded so that with a sudden acceleration of the vehicle carrier cap breakage is held to a minimum. The reinforcement ribs 19, 21, 22, 23, 28, 29 and 27 lend additional strength to the compression bolt area and hence result in added housing strength and rigidity which in and of itself promotes longer gear life.

It should be understood, of course, that the foregoing disclosure relates to only a preferred embodiment of the invention and that it is intended to cover all changes and modifications of the example of the invention herein chosen, for the purposes of the disclosure, which do not constitute departures from the spirit and scope of the invention.

The invention claimed is:

1. A differential housing cover comprising:
   a cover member;
   first and second threaded bores in said cover member;
   first and second compression bolts threadably engaged with said first and second threaded bores, respectively, said first and second threaded bores and said first and second compression bolts having a spatial geometry for placing first and second terminations of said compression bolts in abutment with conventional carrier caps in a standard differential transmission system when said cover member is coupled thereto.

2. The differential housing cover of claim 1 wherein:
   said first and second terminations of said first and second compression bolts consist of first and second swivel caps, respectively.

3. The differential housing cover of claim 1 and further including:
   first and second lock nuts in threadable engagement with said first and second compression bolts, respectively.

4. The differential housing cover of claim 1 wherein:
   said cover member includes a plurality of reinforcement ribs converging on said first and second compression bolts.

* * * * *